US012619742B2

(12) United States Patent
Vaks et al.

(10) Patent No.: US 12,619,742 B2
(45) Date of Patent: May 5, 2026

(54) REFLECTED DISTRIBUTED DATA ACCESS

(71) Applicant: Collibra Belgium BV, Brussels (BE)

(72) Inventors: Vadim Vaks, Holland, PA (US);
Christopher Channing, Riseley (GB)

(73) Assignee: Collibra Belgium BV, Brussels (BE)

( * ) Notice: Subject to any disclaimer, the term of this patent is extended or adjusted under 35 U.S.C. 154(b) by 673 days.

(21) Appl. No.: 17/837,857

(22) Filed: Jun. 10, 2022

(65) Prior Publication Data

US 2023/0401323 A1     Dec. 14, 2023

(51) Int. Cl.
*G06F 21/60*          (2013.01)
(52) U.S. Cl.
CPC .................................. *G06F 21/602* (2013.01)
(58) Field of Classification Search
CPC .... G06F 21/602; G06F 21/6245; G06F 3/067;
G06F 2221/2143; H04L 63/0428; H04L
67/1097
See application file for complete search history.

(56) References Cited

U.S. PATENT DOCUMENTS

| | | | | |
|---|---|---|---|---|
| 11,586,657 B1* | 2/2023 | Buckingham | ........... | G06F 21/53 |
| 2005/0198532 A1* | 9/2005 | Comlekoglu | ........... | H04L 63/08 |
| | | | | 726/22 |
| 2010/0281173 A1* | 11/2010 | Vutukuri | ............... | G06F 21/305 |
| | | | | 709/228 |
| 2013/0198850 A1 | 8/2013 | Barnes et al. | | |
| 2016/0103964 A1* | 4/2016 | Osorio | ................... | G16H 30/20 |
| | | | | 705/3 |

| | | | | |
|---|---|---|---|---|
| 2021/0279310 A1 | 9/2021 | Apsingekar et al. | | |
| 2021/0374163 A1 | 12/2021 | Wang et al. | | |
| 2022/0035790 A1* | 2/2022 | Gentric | ................... | G06F 17/18 |
| 2023/0154578 A1* | 5/2023 | Rahme | ................... | H04L 67/12 |
| | | | | 726/2 |
| 2024/0296237 A1* | 9/2024 | Bessette | ............... | G06F 16/901 |

FOREIGN PATENT DOCUMENTS

CN          114338767 A          4/2022

OTHER PUBLICATIONS

PCT/EP2023/064404 International Search Report and Written Opinion mailed Oct. 12, 2023, 19 pages total.

* cited by examiner

*Primary Examiner* — Trong H Nguyen
(74) *Attorney, Agent, or Firm* — Perkins Coie LLP

(57)          ABSTRACT

The present disclosure is directed to systems and methods for securely reflecting data from a local datastore. In one example embodiment, a user may connect local datastores to edge nodes that may facilitate communication between a third-party data management hub and the local datastores. A user operating the third-party data management hub may request to read/write certain data at the local datastores (that the user owns). Data from the local datastore may be generated in response to the request. The responsive data may be transmitted over an encrypted data session to the data management hub, where the responsive data is reflected to the user on a user interface. The responsive data is stored in a volatile memory store and not moved from the persistent memory at the local datastore. Upon termination of the encrypted data session, the volatile memory store is erased to preserve the privacy/security of the underlying data.

19 Claims, 5 Drawing Sheets

300

Receive request to
access remote data — 302

Analyze request to
determine correct edge
node — 304

Correct edge node
receives request — 306

Edge node executes
request and obtains data — 308

Edge node reflects data
back to user — 310

REFLECTED DISTRIBUTED DATA ACCESS

CROSS-REFERENCE TO RELATED APPLICATION(S)

U.S. patent application Ser. No. 16/776,293 entitled "SYSTEMS AND METHOD OF CONTEXTUAL DATA MASKING FOR PRIVATE AND SECURE DATA LINKAGE"; U.S. patent application Ser. No. 17/103,751, entitled "SYSTEMS AND METHODS FOR UNIVERSAL REFERENCE SOURCE CREATION AND ACCURATE SECURE MATCHING"; U.S. patent application Ser. No. 17/103,720, entitled "SYSTEMS AND METHODS FOR DATA ENRICHMENT"; and U.S. patent application Ser. No. 17/219,340, entitled "SYSTEMS AND METHODS FOR AN ON-DEMAND, SECURE, AND PREDICTIVE VALUE-ADDED DATA MARKETPLACE," are hereby incorporated by reference in their entirety.

TECHNICAL FIELD

The present disclosure relates to distributed data and privacy by design.

BACKGROUND

Data profiling and data quality (DQ) are essential for entities with numerous large datasets and data sources. However, at scale, data profiling and ensuring data quality across such large amounts of data can be cost-prohibitive and utilize scarce computing resources. Data profiling and quality analyses can also take extended period of times when carried out by external or non-native applications. Data profiling and quality checks are often serialized and async from the process of data creation.

In one example, an entity wishing to profile or clean up certain data may discover that certain sensitive data is stored locally rather than on a server accessible via a network. To profile and assess the quality of this local data, the entity would be required to setup an on-premise program to analyze the data (which takes a long time to setup and is expensive from a hardware and maintenance perspective) or send the sensitive local data up to a server to be accessible on the network (which then increases the risk of a privacy breach, as the data is no longer on a local and isolated computer). In some examples, certain sensitive data, such as personally identifiable information, may be required to be stored only on local storage devices and have no storage presence on a third-party/remote server (i.e., persistence at the disk level). To get around these requirements, a client would need to create a bypass in a firewall or rely on heavy process/approval methods like establishing a virtual private connection (e.g., virtual private link), which may trigger certain regulatory and compliance issues, deepening on the nature of the sensitive data. As such, a need exists to access local data (e.g., for profiling, quality assurance, analysis, etc.) in a quick, inexpensive, and secure method without comprising the underlying privacy of sensitive data.

In another example, an entity wishing to perform DQ analyses on certain sets of data may discover that the entity's data sources are fragmented across numerous different datastores. To perform DQ analysis on each of these different datastores, the entity would need to perform an individual analysis on each of those datastores, since they are disconnected and siloed off from the other datastores. As such, a need also exists to aggregate data from different datastores in a secure manner so that DQ analyses may be performed efficiently across multiple different datastores.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
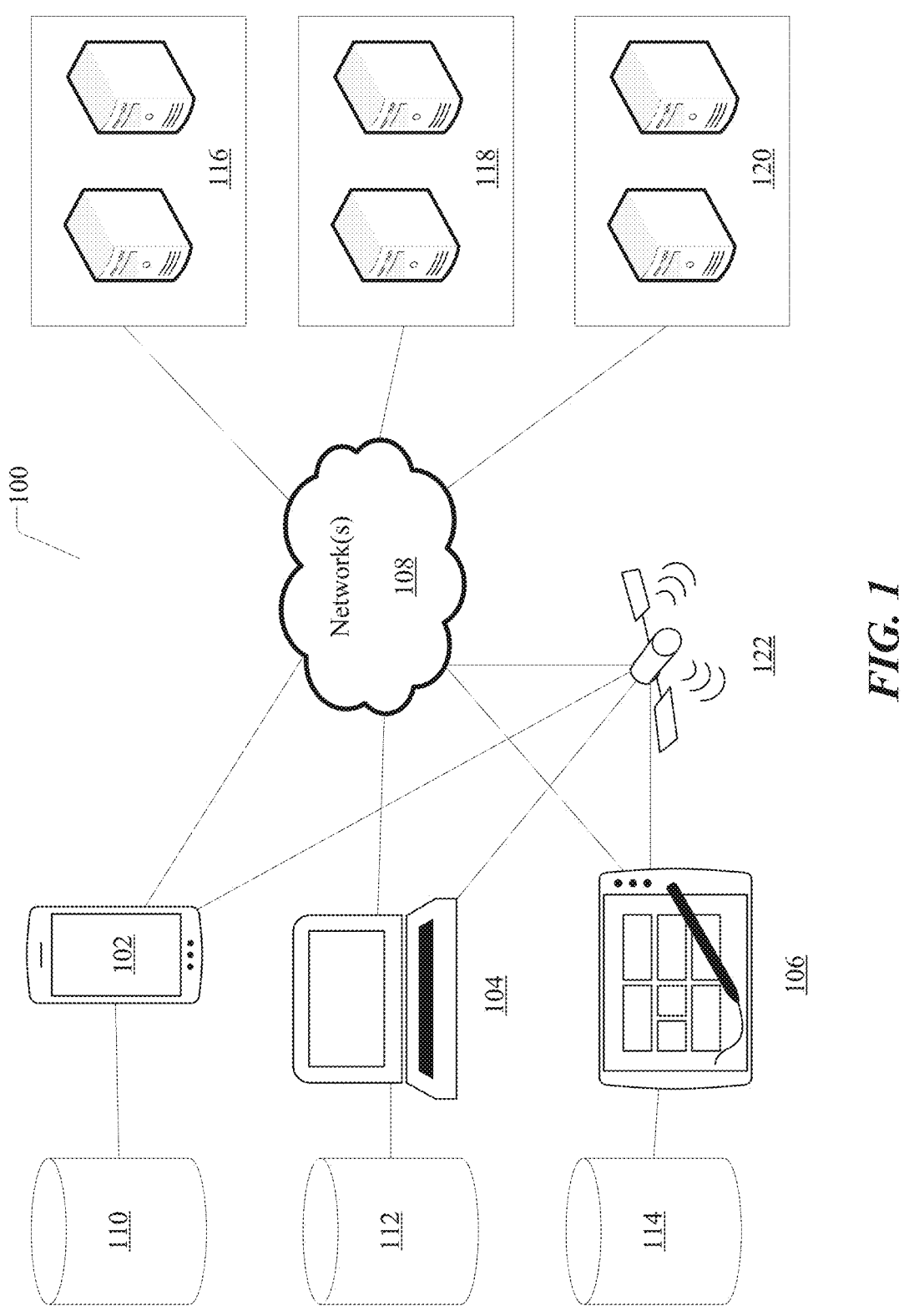
FIG. 1 illustrates an example of a distributed system for securely reflecting data from a datastore, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to improving data profiling and data quality by enabling on-demand, real-time distributed data access while simultaneously preserving the privacy and security of the underlying data. Underlying data may also refer to Source Data, which can be defined as data sets, or samples or subsets thereof, submitted by the user to a third-party service for profiling, sampling, classifying, cataloging, or other forms of analysis. In the systems and methods described herein, the user controls which data is submitted/accessible to the systems. As used herein, the term metadata may also be referred to as Platform Data, which is defined as data or content that classifies, organizes, defines or otherwise characterizes Source Data or a user's enterprise data structure (i.e., metadata), which establishes within a third-party system comprehensive data catalogues, data governance structures, business glossaries, business process descriptions, data stewardship roles and responsibilities, asset and domain lists and similar data governance concepts. Platform Data also includes logs, insights, statistics or reports that a third-party system generates regarding the performance, availability, usage, integrity or security of the third-party service. Platform Data is not Source Data.

A metastore is an object store with a database or file-backed store. The metastore holds the metadata that is associated with the actual, underlying data stored in the datastore. With the proliferation of edge-computing and edge/spoke websites as part of software-as-a-service offerings, some product components may no longer need to share the same network boundary for each client data source. In other words, a client that wishes to access each of its data sources may do so via a single, unified user interface regardless of whether the data sources are stored on a remote server (i.e., cloud-accessible) or a local database/memory.

In one example embodiment, a user (e.g., entity) may own different datastores that house sensitive data, such as PII. The user may connect those datastores to edge nodes, which are used to reflect requests from the user to execute on the underlying datastore. The edge nodes may also be used to reflect certain data from the datastores back to the user but without actually storing that data in persistent storage (e.g., disk) outside of the datastore. In other words, a user may utilize the systems and methods described herein to access each of the user's datastores from a single, unified user interface and perform analyses on the underlying data located in the user's datastores without transferring the underlying data in the datastores to a separate storage location outside of the datastore. Rather, the data that is accessed is merely transmitted over the wire and stored momentarily in a volatile memory store unique to the particular data session that is currently running. In other words, the underlying data in the datastore is reflected to the user based on the user's instructions (which are transmitted to the edge node and subsequently reflected to the underlying datastore, whereby the datastore then reflects the requested data back to the user through a secure channel established by the edge node).

In other embodiments, the cloud based metastore backing a cloud service providing a single view of data, may be comprised of data schema (e.g., Platform Data) that reflects characteristics of the underlying data, such as data type, the number of rows, the number of columns, headers, etc. A client may access this metadata through view and request operations in real-time in a single, unified user interface. The cloud-based metastore may be communicably coupled (via the "data mirror" mechanism described herein) to the local datastore, so the requested data may be displayed on the user interface, but the underlying data that is displayed to the user has not been stored in persistent disk outside of the datastore (i.e., not transmitted and stored in a third-party disk location). Rather, the underlying data is transmitted on the wire and stored momentarily in a volatile memory location that is unique to the data session happening in real-time. Once the data session concludes (or the user simply clicks away from the user interface), the reflected data from the underlying datastore is removed from volatile memory. Further, the reflected data that is transmitted between the datastore and edge node is end-to-end encrypted (e.g., using TLS encryption protocols).

The reflected distributed data access architecture described herein has a plurality of technical benefits. The benefits include, but are not limited to, (i) enhanced security and privacy because the data is not persistently stored outside of the datastore (i.e., the ownership and storage location of the underlying data remains only on persistent disk within the client's datastore), (ii) decreased latency because concurrent look-up times via a distributed data access architecture are faster than individual sequential synchronous lookups of the actual underlying data at each unique datastore location, and (iii) more efficient use of memory resources because there is no need to copy and store the underlying data in a persistent storage, since the accessed data is reflected over the wire in a volatile memory store while the data session is uninterrupted.

Another technical benefit of the reflected distributed data access system described herein is improved privacy-by-design. Typical systems implement privacy features in a reactive or remedial manner; however, in the systems and methods described herein, privacy is embedded into the architecture itself. Specifically, the architecture described herein allows users to maintain ownership and control over their proprietary data in their own datastores. The underlying data in the datastore is not transferred to a third-party persistent storage to be accessed outside of the user's data store. Rather, the underlying data can be viewed and accessed via an end-to-end encrypted data session, where the user is viewing reflected data that is momentarily stored in a volatile memory location directly reserved for the ongoing data session. In other words, accessing the reflected data would require decrypting the data transmission in real-time while the data session is ongoing or directly accessing the dedicated volatile memory location on the actual machine the user is operating. Either scenario is highly unlikely.

In other example aspects, the metastore may be used for storing data quality and data profiling results, among other data analysis operations. Consider a Software as a Service application that aims to connect various datastores housing Source Data at locations that are not directly accessible from the system that houses it. To achieve access into the target secured data sources, edge nodes are setup in the secured location where the target data is stored. The edge nodes may periodically execute data quality assessment activities on the underlying data at the datastores and update the local metastores with findings of those activities. If an error/problem is detected with the underlying data, the problem may be reflected by the edge node from the location where the data is stored to the cloud-based user interface (and stored in the metastore), e.g., in the form of an error notice. The user may then analyze the problem deeper by requesting to see the source of the issue. The user request (at the cloud instance of the application) to view certain data is transmitted to the edge node and then subsequently "reflected" to the datastore. The datastore receives the request, retrieves the underlying data, and returns it to the local edge node. The edge node securely transmits the data via an encrypted data session to a volatile memory location of the cloud instance of the application, there by "reflecting" the underlying data to the user interface. After the user is finished viewing the reflected data, the user may close the data session, and the underlying data housed in the volatile memory is erased. Note that under standard TCP protocol requirements, the underlying data presented to the unified user interface of the cloud-based data management application is presented in a single direction, so that no data can be transmitted back from the cloud-based data management application to the underlying datastore. Note that reflecting data to a datastore and back to a volatile memory location of a cloud instance of the application does not require the use of a metastore.

In another example, data virtualization may be incorporated. An edge-deployed datastore may locally retain data from a data source that is sensitive in nature. The underlying data of the data source can be shared on-demand (via encrypted package delivery) to the cloud-based application without ever exposing the underlying, unencrypted data to persistent storage in a cloud instance. In the data virtualization embodiment, underlying data is copied to a volatile memory location isolated to the ongoing data session at the edge node. This allows for a user to ask complex questions of that dataset from a remote instance of the application, have the edge node perform the required processing on the data in volatile memory to answer the question, and then only "reflect" the limited data required for the response back to the user. The target dataset is not permanently stored outside of the underlying datastore. In other words, a data management application that a user is operating may not have access to the actual underlying data (source data) in the datastore due to secure network perimeters (e.g., encrypted transmission of underlying data to edge node and momentary storage in volatile memory stores while data session is live).

FIG. 1 illustrates an example of a distributed system for securely reflecting data from a datastore, as described herein. Example system 100 presented is a combination of interdependent components that interact to form an integrated whole for consolidating and enriching data. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may store certain client-sensitive data on databases 110, 112, and 114. The client devices may also be communicably coupled to a distributed metastore on an edge site, via network(s) 108 that may be communicably coupled to a central data management application or hub (e.g., data governance center). The client devices may also be configured to receive reflected data from datastores based on certain requests received by the datastore. The client-specific data may be required to be stored in local databases 110, 112, and 114, in some examples. If the client-specific data contains PII, then the PII may be partitioned off in the local databases 110, 112, and 114. Client devices may receive reflected data from one of the datastores 110, 112, and 114. In other examples, client devices 102, 104, and 106 may be considered "edge nodes" that reflect data and commands back to the datastores 110, 112, and 114 and/or other devices connected to network(s) 108. The edge nodes and client devices may be connected to the central hub via network(s) 108 and/or satellite 122 to server(s) 116, 118, and/or 120. Server(s) 116, 118, and/or 120 may be third-party servers that may receive data reflected from datastores 110, 112, and 114 and transmitted via edge nodes across network(s) 108. An edge node (e.g., client devices 102, 104, 106 or servers 116, 118, and/or 120) may receive commands from a client via the centralized data management application to read certain underlying data/datasets in the datastores, to which the edge nodes are connected. The data may be displayed on a user interface (i.e., reflected or mirrored) at the central hub location, but the underlying data itself may remain in the local storage at databases 110, 112, and 114. Specifically, certain requested underlying data stored in datastores (e.g., 110, 112, and 114) may be encrypted and transmitted over network(s) 108 to a volatile memory location tied to the live data session, where a user may view the requested data as long as the data session is in operation. For example, a user may be connected to network(s) 108 via a device that is operating a central data management application. From the application, a user may request to receive a status update on certain data quality tests run on a datastore that is stored, e.g., in database 110. Edge node 102, which is connected to datastore 110, may receive the command over the network(s) 108, and edge node 102 may reflect that command to the datastore 110. Edge node 102 receives data from datastore 110 that is then reflected back to the user device that is operating the central data management application. It is important to note that the actual underlying data stored in the datastore 110 is not transmitted to persistent storage outside of database 110. Merely the underlying data is reflected momentarily to the user device within the data management application by using volatile memory. Upon closure of the data session, the data stored in the volatile memory location may be erased. Note, the requested underlying data that is encrypted and transmitted over network(s) 108 is not stored in persistent storage at third-party data locations, such as databases 116, 118, and/or 120.

In aspects, a client device, such as client devices 102, 104, and 106, may have access to one or more datasets or data sources and/or databases (e.g., Source Data) comprising client-specific data. In other aspects, client devices 102, 104, and 106, may be equipped to receive broadband and/or satellite signals from an edge node reflecting client-specific read requests from a central data management application. The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices. In other example aspects, client devices 102, 104, and 106 may be considered edge nodes that are communicably coupled to an underlying datastore.

In some instances, a user may have write permissions to manipulate certain data stored locally at databases 110, 112, and/or 114. The write operation may be captured by the edge site (e.g., at client devices 102, 104, and 106) and then reflected to the local datastores 110, 112, and/or 114 via network(s) 108 and/or satellite 122. Such write operations may be serviced from a local metastore instance in order to partition the third-party data management application from the underlying datastore(s). Read operations may also be serviced from a local metastore instance, and access to sensitive data may be mirrored (or reflected) to the central data management application rather than transmitted to a persistent storage location (e.g., third-party disk storage) from its underlying location.

Figure 2:
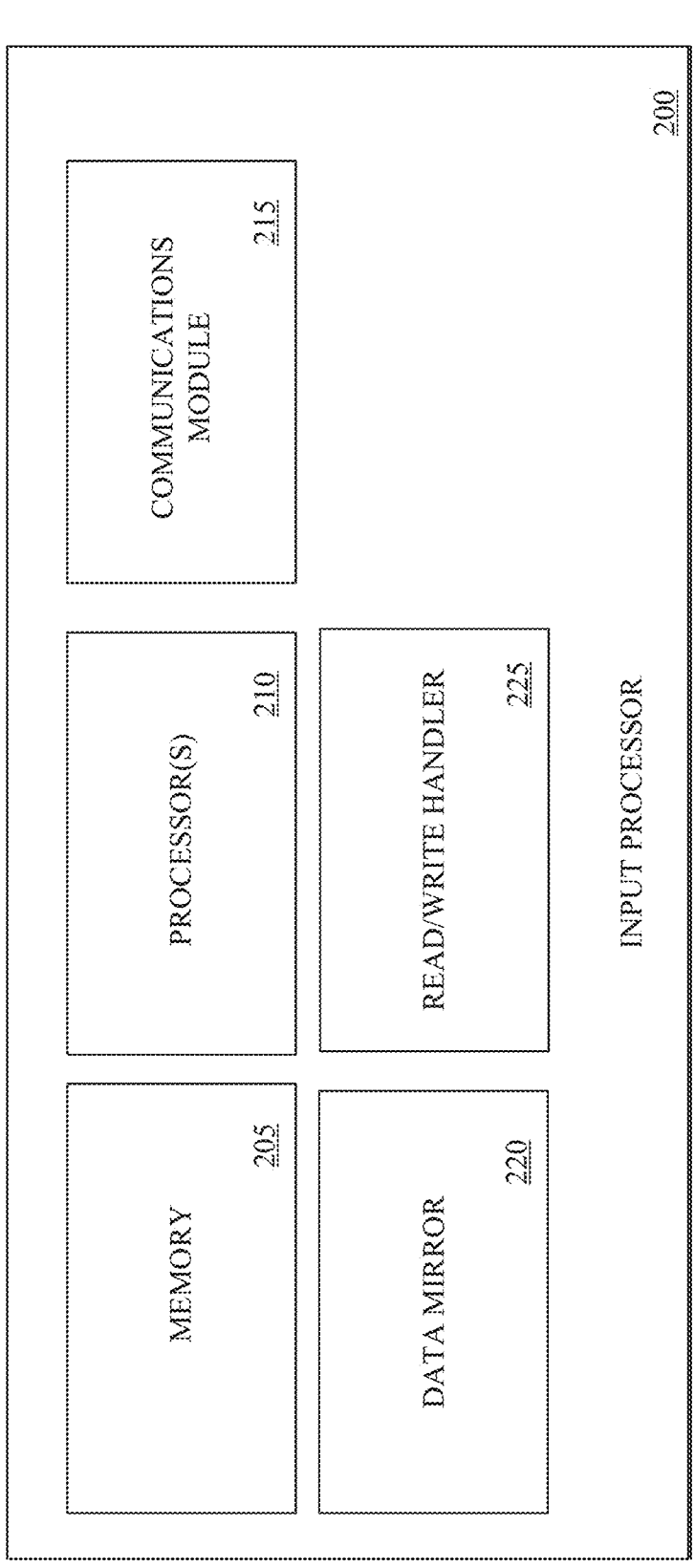
FIG. 2 illustrates an example input processor for implementing systems and methods for securely reflecting data from a datastore.

FIG. 2 illustrates an example input processor for implementing systems and methods for securely reflecting data from a datastore, as described herein. Input processor 200 may be embedded within a client device (e.g., client devices 102, 104, and/or 106), remote web server device (e.g., devices 116, 118, and/or 120), and other devices capable of implementing systems and methods for securely reflecting data from a datastore. The input processing system contains one or more data processors and is capable of executing algorithms, software routines, and/or instructions based on processing data provided by at least one client source and/or third-party source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 2, the disclosed system can include memory 205, one or more processors 210, communications module 215, data mirror

220, and read/write handler 225. Data mirror 220 may be configured to communicate with local databases (datastores) and generate metadata based on the underlying, locally-stored data and user requests regarding DQ analysis (for example) and reflect that data via an edge site to a central data management application. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of metastore generator 220, read/write handler 225, and/or data mirror 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Communications module 215 is associated with sending/receiving information (e.g., transmitting encrypted data from data mirror 220, read/write commands from read/write handler 225), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 215 sends information output by data mirror 220 to a central data management application or hub. Specifically, communications module 215 may facilitate the "reflecting" of data from an edge node to the central data management application. The metadata may be representative of underlying actual data (e.g., data types, number of rows, number of columns, other schema, etc.; aka Platform Data), but the underlying data (Source Data) is safely stored in a local database and not transmitted across networks to a persistent storage location located on a third-party server. In other examples, based on a user request that is reflected from an edge site to the underlying datastore, certain retrieved data from the datastore (in response to the user request) may be transmitted over an encrypted data session to a volatile memory location to be reflected on a user interface managed by the central data management application or hub. Upon closing the data session, the data stored in volatile memory is erased. In other examples, communications module 215 may transmit read/write commands from the central data management application, where a read command may be a command to display certain datasets and where a write command may be a command to alter certain data or an underlying application programming interface. Such communications may be transmitted to client devices 102, 104, and/or 106, as well as memory 205 to be stored for future use. In some examples, communications modules may be constructed on the HTTP protocol through a secure REST server(s) using RESTful services.

Data mirror 220 may be configured to facilitate the "mirroring" (or reflection) of data between devices and edge nodes. A datastore may be situated in a client's environment, between an edge computing site and a local computer cluster where local data is housed. The edge site may comprise an edge proxy, edge controller, a data access service, and a data quality agent. An edge proxy may be defined as a component responsible for maintaining a secure channel for user instructions from the central data management application to affect the target location hosting the target data source. This channel is logical and not permanent. The edge controller may be defined as a component that uses the secure channel provided by the edge proxy to constantly poll (i.e., listen for) data from the central data management application that contains user instructions. Upon reception of user instructions that are targeted to a particular edge site, the appropriate edge site receives those instructions and facilitates communication to the data access service (or data quality service) that ultimately processes the request locally at the target datastore. The data access service (or data quality service) may be defined as a service that processes the user instructions. This is part of the data mirror 220. For example, the instructions may be directed to data quality analysis, catalog service, policy management, data virtualization, etc. Specifically, the data access service can deserialize the user instructions to execute them locally at the datastore level. The response the datastore transmits back to the data access service may be reflected via the data mirror 220 module back through the edge controller, edge proxy, and eventually to the central data management application, where the data may be displayed via an encrypted data session. The data quality agent may be used for the example use case of data quality analysis. The data quality agent is responsible for initiating data processing jobs and is controlled by the local DQ service on the client devices. The DQ agent may perform DQ jobs consistent with user instructions processed by the data access service. The data access service may be communicably coupled to the datastore. The data quality service may also be communicably coupled to a central data management application. The data mirror 220 may accurately transmit user instructions received via the edge proxy to the underlying datastore and reflect data received from the underlying datastore to the central data management application. For example, an edge site may be located in a virtual LAN that can communicate both with a data-quality module (e.g., data-quality metastore) and a central data management application. The data mirror 220 may also be configured to receive information from communications module 215 regarding the type of data that will be reflected in the metadata. For example, data mirror 220 may be configured to not display certain sensitive information to the central data management application.

Read/write handler 225 may be configured to receive commands from the central data management application and replicate those commands locally at a local computer to read/write certain locally-stored data. For instance, a read command from a central data management application may comprise a request to access new data. The read/write handler 225 may include the data access service which receives the user instructions from the edge proxy and processes the instructions to be executed at the local datastore level. The read/write handler 225 may first receive a user command via data mirror 220 and pass the command to the edge site (via the edge proxy and edge controller). The edge site may then pass this command to the datastore (via the data access service), which is communicably coupled to the local computer, so that the read command is executed locally on the data stored on the local database. The read/write handler 225 may receive a response from the DQ service, in which the response contains certain requested data based on the user instructions. The data may then be encrypted and transmitted to a volatile memory location where the user may be able to view the reflected data at the central data management application.

Data mirror 220 is also configured to ensure that certain data from local datastores do not flow to persistent storage locations outside of authorized storage locations. This is especially important when a user is accessing the datastore via a reflected mirror process (via data mirror 220), receiving updates regarding the data quality of a certain datastore, and/or issuing commands that affect the underlying data in the datastore. The underlying data is encrypted and not transmitted to persistent storage but rather reflected momentarily to a user via volatile memory means.

Similarly, a write command from read/write handler 225 may transmit a write command to the local database via the edge proxy, edge controller, and data access service. From a user perspective, the commands appear to happen in sync, but the commands may occur async due to the edge site and edge site deployment. This is to ensure that each command is accurately captured and transmitted while protecting the security and privacy of the underlying local data.

Read/write handler 225 receives commands from the central data management application via communications module 215, in some examples.

Figure 3:
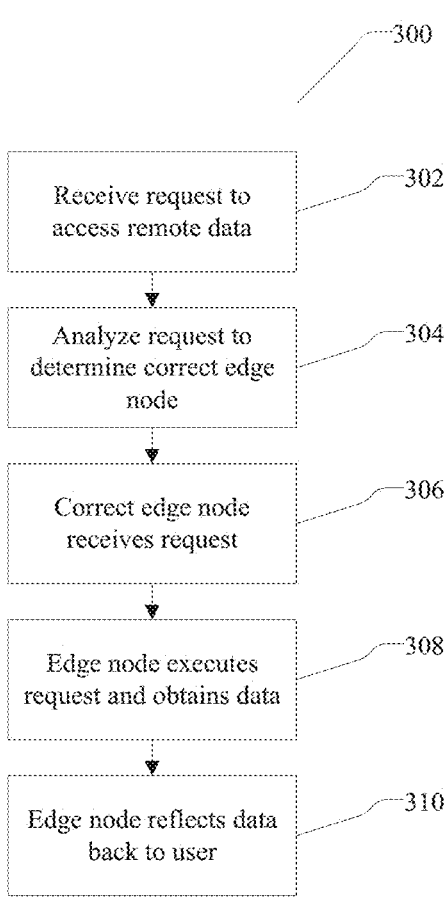
FIG. 3 illustrates an example method for securely reflecting data from a datastore, as described herein.

FIG. 3 illustrates an example method 300 for securely reflecting data from a datastore. Method 300 begins with step 302, receive request to access remote data. At step 302, a request to access data located in a datastore, such as local databases 110, 112, and 114 from FIG. 1, is received. This request may be received from a central data management application that is communicably coupled to edge nodes that are communicably coupled to datastores. In step 304, the request is analyzed to determine which datastore the request is targeting, which is then used to determine the correct target edge node that is communicably coupled to the relevant datastore. Certain preloaded requests may already be in existence, so that when a certain request is received by the system, the request is automatically associated with a certain edge node without further analysis.

At step 306, the correct edge node receives the request. In between steps 304 and 306, other sub-steps may occur. For example, after the correct edge node is identified in step 304, the request may be forwarded to an edge gateway, where the request is tagged for the target edge node. While the request is at the gateway, the channel from which the request came remains open pending response. Further, the target edge node may comprise a controller that is consistently polling the edge gateway (e.g., every 5 seconds or other duration of time). When the target edge node controller polls the gateway and sees a request for its edge node, the target edge node controller forwards the request to the edge node.

The reason why the target edge node polls the edge gateway is because the edge gateway cannot forward the request directly to the target edge node, since there is no network path between the target edge node and the edge gateway. The edge gateway cannot access secure, non-publicly addressable endpoints in the system. Rather, the user instruction is transmitted to a queue associated with the target edge node. The target edge node then polls the queue at the edge gateway until the user instruction is received at the queue. Once the user instruction is in queue, and the target edge node polls the queue, the user instruction is then transmitted to the target edge node.

At step 308, the edge node executes the request and obtains the data from the datastore to which it is connected. In some instances, the data may be obtained from a connected datastore, and in other instances, the data may be obtained from a connected metastore. The data is encrypted while remaining at the edge node.

At step 310, the data obtained by the edge node is reflected back to the user device from where the central data management application is running. Prior to step 310 and after step 308, the edge node may query the edge controller, which may open a secure data channel between the gateway and the edge node. The data that is reflected from the edge node back to the user device may be a status report regarding the data quality of the underlying datastore. If the status report indicates issues, then the user may issue a subsequent request to obtain the raw data at the datastore to see the problem. The data may be reflected from the edge node to the user device, but the data is only stored in volatile memory locations, not on persistent storage outside of the datastore. Thus, when the data channel is closed, the reflected data is immediately erased.

In some examples, from the perspective of the client, the client may first receive a summary of each datastore the client has access to (e.g., a broadcast request), regardless of whether the datastore is located locally or externally. The client may then execute read and/or write commands via the user interface of the central data management application. A read command to a local datastore may pass through a distributed metastore at a customer's edge site, which may then obtain the requested metadata and reflect it back to the user viewing the user interface of the central data management application. This occurs without actually transmitting any underlying local data to a persistent memory storage location hosted by a third-party. Rather, the data is transmitted over an end-to-end encrypted data session and stored in a volatile memory storage location tied to the encrypted data session. Upon conclusion of the data session, the volatile memory storage location is erased. In some examples, conclusion of a data session can occur when the user exist the central data management application, clicks out of the current screen on the user interface, and/or a certain time duration expires that automatically concludes the data session.

Figure 4:
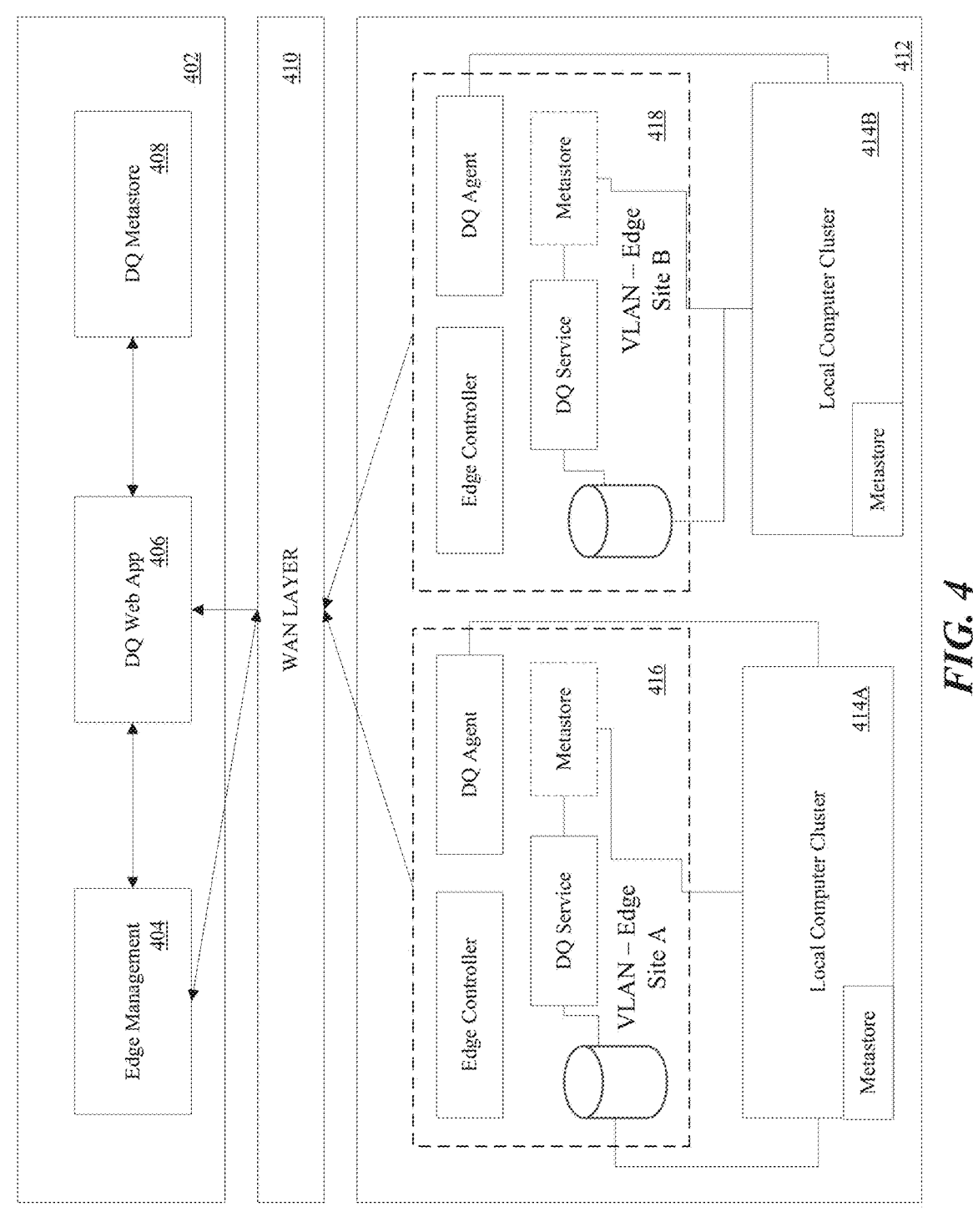
FIG. 4 illustrates an example distributed environment for securely reflecting data from a datastore.

FIG. 4 illustrates an example distributed environment 400 for securely reflecting data from a datastore. Environment 400 displays a centralized data management application (e.g. data intelligence cloud, data governance center, etc.) 402. Within this data management application exists edge management application 404, data-quality web application 406, and data-quality metastore 408. The DQ web application 406 is a main point of interaction for users. It has no access to underlying data sources. The DQ Metastore 408 stores data required for the DQ cloud application 402 to function (catalog, user, administrative, etc.), as well as to cache metadata sourced from edge nodes/sites that is not considered sensitive data (aggregates, schema, Platform Data, etc.). By storing such data in a DQ metastore 408, read/write requests to underlying local data stores are decreased. Edge Management 404 is a main gateway for user interactions with remote data sources. For example, when a user clicks on a data source or data from the user interface in the DQ web application 406, the DQ web application 406 sends the request to Edge Management. Edge Management queues that request for pickup by a target edge node/site (e.g., an edge node marked as owning/proximate to the target data source).

The wide area network (WAN) layer 410 allows for communications to flow from edge sites 416 and 418 into the data management application 402. Customer network 412 comprises at least one local computer cluster with local datastores and at least one edge site comprising a metastore. In this example environment 400, customer network 412 comprises local computer cluster 414, which comprises local databases. The network 412 also comprises edge site A 416 and edge site B 418, which both are located on a virtual local area network (LAN). Each edge site houses at least one edge controller, a data-quality agent, a data-quality service, and a metastore. The metastores are configured to communicate with the local datastores and obtain the metadata representative of the underlying actual data stored in the local databases. This metadata may then be communicated via the WAN layer 410 back to the data management application 402. However, the underlying local data remains at local computer cluster 414. The metastore is simply a reflection of the underlying local data.

The Edge Nodes/Sites 416 and 418 are where user instructions initiated in the DQ could application 402 are actually executed. The components that run here are described in detail with respect to FIG. 2. The difference between edge node 416 and node 418 is which data the node is servicing based on scoping requirements and/or constraints set by the user. There may be one or many edge nodes depending on the number and locations of each user datastore.

The local computer clusters 414A and 414B represents the computers that will perform the work of actually scanning underlying data (Source Data) for quality. In some examples, as illustrated, a local computer cluster may exist for each edge node. In other examples, two different edge nodes may access the same local computer cluster but have permission to access only certain portions of the underlying data housed in the local datastore (e.g., due to scoping constraints of each edge node).

The Edge Site Metastores located in edge nodes 416/418 may be configured to store data required to run the edge DQ! Service. Additionally, the metastores located in edge nodes is where sensitive customer data extracted from an underlying data source(s) as a result of DQ check and/or user instructions are stored. For example, full fidelity examples of records that failed DQ checks, particularly sensitive individual values such as account numbers, account balances, social security numbers, etc.) may be stored in the edge metastores.

Edge node/site metastores are isolated to the relevant datastores the edge nodes are servicing, whereas the DQ metastore 408 services all available data sources connected to the central data management application 402.

The data quality stack exhibits both synchronous and asynchronous data flows with the metastore. The data flows may be separated by three different classes: a user class, a job class, and an agent class. The user class may permit synchronous read/write operations performed by a user. An example of a synchronous read/write operation may be augmenting a configuration via a user interface or API. The job class may permit asynchronous read/write operations. For example, a user that needs to view persisting dataset profiles and statistics would use a job class read/write operation. The agent class may permit asynchronous read/write operations that manage job details, such as status updates.

In this example environment 400, job and agent input-output operations may happen in the context of an edge site. For certain jobs, such as DQ-check jobs, configuration is needed from the metastore, such as connection details and model configurations. In other words, information regarding how the metastore is communicably coupled to the local database and what types of metadata are being obtained may be required to establish certain classes of data flows.

In other examples, non-sensitive data may have a bi-directional flow between the data management application 402 and the customer's network 412.

The metastore in the example environment 400 is used to serve the data management application 402, as it will contain the metadata described according to the underlying local data. For non-sensitive data, read operations may be serviced directly from the local metastore housed at the local computer cluster 414. For sensitive customer data, read operations may be delegated to the relevant edge site depending on the scope characteristics of the data and the edge site. Write operations may be mirrored atomically to a relevant edge site. At the edge site, the write operation may be processed locally.

The DQ metastore 408 mirrors the data management application 402 instance with the exception of certain datasets not resident to a given edge site. The local metastore on local computer cluster 414 may contain sensitive customer data as a result of certain data processing and data profiling jobs. At the edge site, read operations may be serviced from the local metastore instance at computer 414. Write operations may also occur locally. If the write operation is targeting non-sensitive data, then the operations may be mirrored to a durable Write Ahead Log (WAL) backed by a local metastore instance. A WAL published may asynchronously publish entries to the data-quality web application 406 running in the data management application 402 instance (i.e., the data management cloud or data intelligence cloud).

Figure 5:
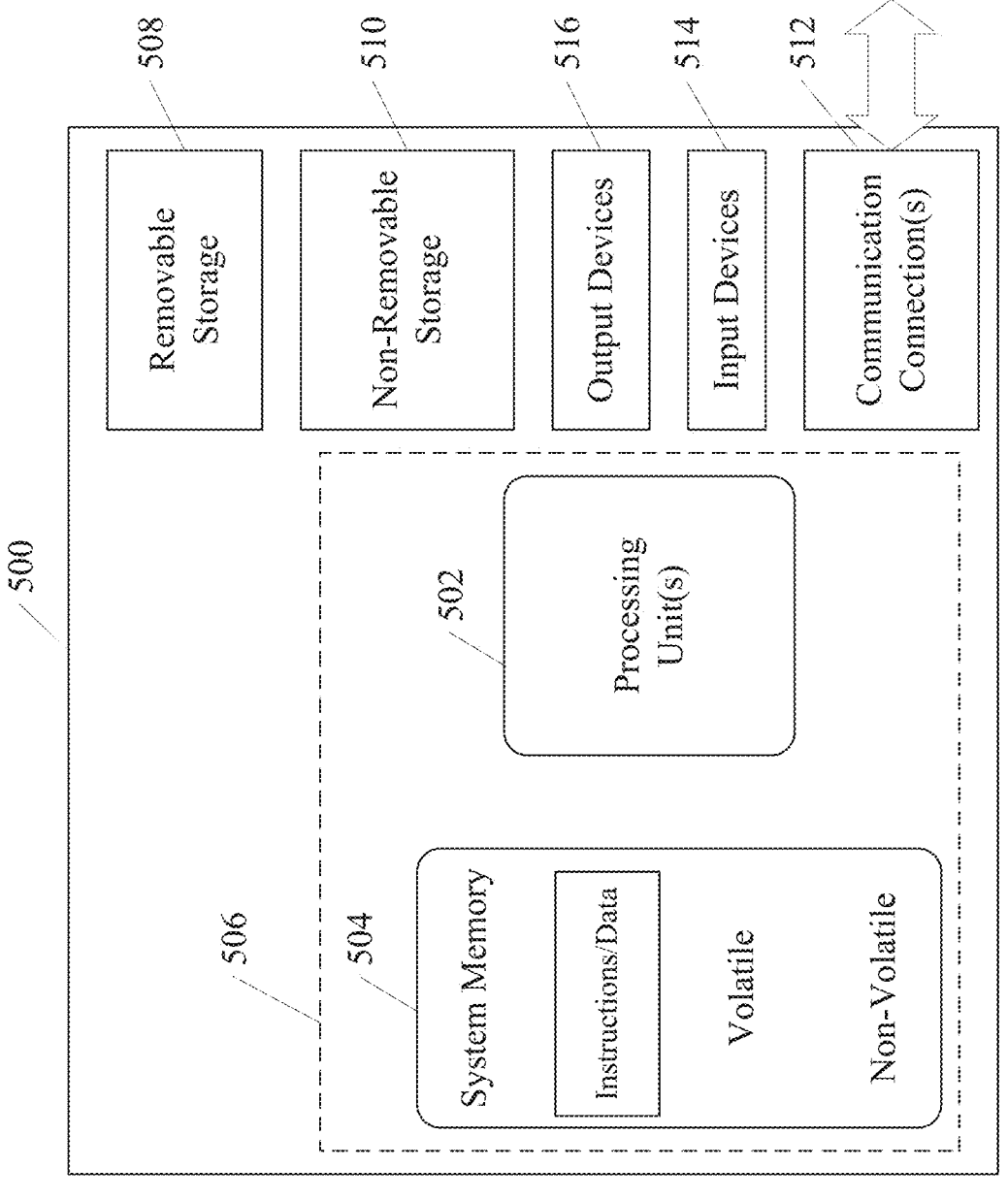
FIG. 5 illustrates one example of a suitable operating environment in which one or more of the present embodiments may be implemented.

FIG. 5 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device (s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for reflecting data from at least one datastore, comprising:
   a memory configured to store non-transitory computer readable instructions; and
   a processor communicatively coupled to the memory, wherein the processor, when executing the non-transitory computer readable instructions, is configured to:
   receive at least one user instruction, wherein the at least one user instruction targets the at least one datastore;
   transmit the at least one user instruction to a queue at an edge gateway,
      wherein the queue is associated with an edge node,
      wherein the edge node lacks a network path to the edge gateway,
      wherein the edge node is associated with the at least one datastore, and
      wherein the edge node polls the queue to receive the at least one user instruction;
   initiate an encrypted data session with the edge node;
   receive reflected data retrieved from the at least one datastore over the encrypted data session while the encrypted data session is uninterrupted,
      wherein the reflected data is stored only in at least one volatile memory location associated with the encrypted data session; and
   while the encrypted data session is in progress, display the reflected data.

2. The system of claim 1, the processor further configured to: when the encrypted data session is disconnected, erase the reflected data from the at least one volatile memory location.

3. The system of claim 1, the processor further configured to: receive at least one data-quality result from a metastore.

4. The system of claim 3, the processor further configured to: based on the at least one data-quality result from the metastore, transmit a second user instruction to the edge node.

5. The system of claim 3, wherein the at least one data-quality result is an error notice associated with the at least one datastore.

6. The system of claim 1, wherein the at least one user instruction is deserialized at the edge node prior to execution at the at least one datastore.

7. The system of claim 1, wherein the reflected data is encrypted prior to transmission over the encrypted data session.

8. The system of claim 1, wherein the at least one user instruction is at least one of: a read command and a write command.

9. The system of claim 1, the processor further configured to: generate a metastore.

10. The system of claim 9, wherein the metastore comprises at least one scoping requirement associated with underlying data stored in the at least one datastore.

11. The system of claim 9, wherein the metastore is associated with a second datastore.

12. The system of claim 9, wherein the metastore comprises at least one of: schema, user instructions, DQ analysis results, and platform data.

13. The system of claim 1, wherein the at least one user instruction is a view command to view information associated with a plurality of datastores in a unified user interface.

14. The system of claim 13, the processor further configured to: based on the view command, display platform data associated with the plurality of datastores in the unified user interface.

15. A method for reflecting data from a datastore, comprising:

connecting at least one edge node to the datastore;

transmitting a first user instruction to process the data stored in the datastore for data quality, wherein the first user instruction is transmitted to a queue at an edge gateway, wherein the queue is associated with the at least one edge node, wherein the at least one edge node lacks a network path to the edge gateway, and wherein the at least one edge node polls the queue to receive the at least one user instruction;

receiving at least one data quality result from the at least one edge node;

based on the at least one data quality result received from the at least one edge node, transmitting a second user instruction to read a portion of the data stored in the datastore;

initiating an encrypted data session;

receiving reflected data from the at least one edge node over the encrypted data session while the encrypted data session is uninterrupted, wherein the reflected data is stored only in at least one volatile memory location associated with the encrypted data session; and displaying the reflected data on a user interface.

16. The method of claim 15, further comprising erasing the reflected data from the at least one volatile memory location upon disconnection of the encrypted data session.

17. The method of claim 15, further comprising erasing the reflected data from the at least one volatile memory location upon disconnection of the user interface.

18. A non-transitory computer-readable media storing computer executable instructions that when executed cause a computing system to perform the steps for reflecting data from a datastore, comprising:

connecting at least one edge node to the datastore;

transmitting a first user instruction to process the data stored in the datastore for data quality, wherein the first user instruction is transmitted to a queue at an edge gateway, wherein the queue is associated with the at least one edge node, wherein the at least one edge node lacks a network path to the edge gateway, and wherein the at least one edge node polls the queue to receive the at least one user instruction;

receiving at least one data quality result from the at least one edge node;

based on the at least one data quality result received from the at least one edge node, transmitting a second user instruction to read a portion of the data stored in the datastore;

initiating an encrypted data session;

receiving reflected data from the at least one edge node over the encrypted data session while the encrypted data session is uninterrupted, wherein the reflected data is stored only in at least one volatile memory location associated with the encrypted data session; and displaying the reflected data on a user interface.

19. The non-transitory computer-readable medium of claim 18, wherein the at least one data quality result from the at least one edge node is an error notice.

* * * * *